United States Patent
Gonda

(10) Patent No.: US 7,746,768 B2
(45) Date of Patent: *Jun. 29, 2010

(54) SYSTEM AND METHOD FOR SUPPORTING SDH/SONET APS ON ETHERNET

(76) Inventor: Rumi Sheryar Gonda, 106 Steele La., Boxborough, MA (US) 01719

( * ) Notice: Subject to any disclaimer, the term of this patent is extended or adjusted under 35 U.S.C. 154(b) by 70 days.

This patent is subject to a terminal disclaimer.

(21) Appl. No.: 12/125,282

(22) Filed: May 22, 2008

(65) Prior Publication Data

US 2008/0259786 A1  Oct. 23, 2008

Related U.S. Application Data

(63) Continuation of application No. 10/235,174, filed on Sep. 4, 2002, now Pat. No. 7,394,758.

(60) Provisional application No. 60/317,035, filed on Sep. 4, 2001.

(51) Int. Cl.
H04J 1/16 (2006.01)

(52) U.S. Cl. ............... 370/218; 370/224; 370/907; 709/223

(58) Field of Classification Search ........... 370/223, 370/224, 225, 226, 227, 228, 216, 218, 466, 370/907; 709/223
See application file for complete search history.

(56) References Cited

U.S. PATENT DOCUMENTS

| | | | |
|---|---|---|---|
| 4,646,286 A | 2/1987 | Reid et al. | |
| 4,837,760 A | 6/1989 | Reid et al. | |
| 5,623,357 A | 4/1997 | Kight et al. | |

(Continued)

FOREIGN PATENT DOCUMENTS

EP  0980226 B1  2/2000

(Continued)

OTHER PUBLICATIONS

Canadian Office Action for Application No. 2,459,286, dated Mar. 13, 2009.

(Continued)

*Primary Examiner*—Dmitry H Levitan
*Assistant Examiner*—Dady Chery
(74) *Attorney, Agent, or Firm*—Sean D. Detweiler, Esq.; Morse, Barnes-Brown & Pendleton, P.C.

(57) ABSTRACT

An Ethernet PHY hardware device supports Ethernet MAC SDH/SONET Automatic Protection Switching (APS) functionality for managing protection from failures and recovery from failures on an Ethernet network. An Ethernet PHY sublayer stored on the Ethernet PHY hardware device is configured to monitor working and protect channels and generate an interrupt upon detection of a hard failure or a soft failure. Upon detection of port failures or link failures, the Ethernet PHY sublayer generates the interrupt to invoke an Ethernet MAC Client APS Controller configured to generate and terminate APS requests on working and protect channels to manage protection of working and protect channels from failures and recovery from failures on the Ethernet network. The Ethernet PHY hardware device is configurable for use with a plurality of different network topologies to manage protection from hard or soft failures and recovery from hard or soft failures on the Ethernet network using the Ethernet PHY sublayer.

10 Claims, 7 Drawing Sheets

U.S. PATENT DOCUMENTS

| | | | |
|---|---|---|---|
| 5,671,213 | A | 9/1997 | Kurano et al. |
| 5,740,157 | A | 4/1998 | Demiray et al. |
| 5,777,761 | A | 7/1998 | Fee |
| 5,787,070 | A | 7/1998 | Gupta et al. |
| 5,884,017 | A | 3/1999 | Fee |
| 6,112,311 | A | 8/2000 | Beardsley et al. |
| 6,188,667 | B1 | 2/2001 | Roberts et al. |
| 6,219,739 | B1 | 4/2001 | Dutt et al. |
| 6,332,198 | B1 | 12/2001 | Simons et al. |
| 6,359,858 | B1 | 3/2002 | Smith et al. |
| 6,363,077 | B1 | 3/2002 | Wong et al. |
| 6,373,826 | B1 | 4/2002 | Russell et al. |
| 6,377,374 | B1 | 4/2002 | Davis et al. |
| 6,385,201 | B1 | 5/2002 | Iwata et al. |
| 6,393,483 | B1* | 5/2002 | Latif et al. .................. 709/226 |
| 6,535,489 | B1 | 3/2003 | Merchant et al. |
| 6,735,171 | B2 | 5/2004 | Takeguchi et al. |
| 6,766,482 | B1 | 7/2004 | Yip et al. |
| 6,992,975 | B1 | 1/2006 | Daniel et al. |
| 7,031,341 | B2 | 4/2006 | Yu et al. |
| 7,093,027 | B1* | 8/2006 | Shabtay et al. .............. 709/239 |
| 7,170,852 | B1 | 1/2007 | Adler |
| 2001/0030962 | A1 | 10/2001 | Song et al. |
| 2001/0043560 | A1 | 11/2001 | Liu et al. |
| 2001/0052084 | A1 | 12/2001 | Huang et al. |
| 2002/0009092 | A1 | 1/2002 | Seaman et al. |
| 2002/0023170 | A1 | 2/2002 | Seaman et al. |
| 2002/0027908 | A1 | 3/2002 | Kalkunte et al. |
| 2002/0091921 | A1 | 7/2002 | Kunzinger |
| 2002/0097671 | A1 | 7/2002 | Doverspike et al. |
| 2002/0110148 | A1 | 8/2002 | Hickman et al. |
| 2003/0012135 | A1 | 1/2003 | Leroux et al. |
| 2003/0016624 | A1* | 1/2003 | Bare .......................... 370/217 |

FOREIGN PATENT DOCUMENTS

| | | |
|---|---|---|
| EP | 0981226 A1 | 2/2000 |
| JP | 9-74412 | 3/1997 |
| JP | 10-145409 | 5/1998 |
| JP | 11-112539 | 4/1999 |
| JP | 11-205356 | 7/1999 |
| WO | WO-00/74282 A2 | 12/2000 |
| WO | WO-00/76147 A1 | 12/2000 |

OTHER PUBLICATIONS

Appian Communications, Inc. "Appian More than Doubles Metro Access Network Revenue Potential and Brings Unprecedented, Sonet-Class Data Brotection to IP/Optical Edge", press release retrieved from http://www.businesswire.com/cgi-bin/ts_headline.sh?/bw.082800/202412578; 2 pages (Aug. 28, 2000).

Busi, Italo et al., "OAM&P Requirements for RPR," Portland IEEE 802.17 Meeting (2001).

Cisco Systems, Inc. "Understanding Rapid Spanning-Tree Protocol (802.1w)", retrieved from http://www.cisco.com/warp/public/473/146.html; 14 pages (Oct. 3, 2002).

Faber, Angela Tozzi, "RPR Fault and Performance Monitoring Primitives and Parameters," IEEE 802.17 (2001).

Fan, Jason, "A Study of Protection Switchings: Wrapping or Steering," Luminous Networks, Inc., retrieved online at http://www.ieee802.org/17/documents/presentations/mar2001/jfan_prot_02.pdf IEEE 802.17 (2001).

Fan, Jason C., "Topology Discovery and Protection Switching," Luminous Networks, retrieved online at http://ieee802.org/17/docunnents/presentations/jul2000/lum_top_pro.pdf, IEEE 802 Plenary—La Jolla, CA: RPRSG (2000).

Gimpelson, T. "Africa makes Ethernet resilient", retrieved from http://www.nwfusion.com/edge/news/2002/0122atrica.html; 6 pages (Jan. 22, 2002).

Gimpelson, T. "Metro Ethernet's third option", retrieved from http://www.nwfusion.com/edge/news/200210311edge.html : 8 pages (Mar. 11, 2002).

Jha, Pankaj K., "Ring/Mesh Network Configurations," IEEE 802.17 Meeting (2001).

internetPhotonics "Bringing Carrier-Grade Ethernet to Metro Networks", retrieved from http://www.internetphotonics.com/pdfs/IP_CarrierGrade_whitepaper.pdf; 5 pages (Feb. 28, 2002).

IEEE, "IEEE Standard for Information technology, Telecommunications and information exchange between systems, Local and metropolitan area networks, Common specifications, Part 3: Media Access Control (MAC) Bridges," ANSI/IEEE Std 802.10, pp. 54, 62 (1998).

IEEE, "802.3, IEEE Standard for Information technology," Section One, pp. 2, 3, 34 (2002).

IEEE, "802.3, IEEE Standard for Information technology," Section Two, pp. 2, 345, 347, 348 (2002).

IEEE, "802.3, IEEE Standard for Information technology," Section Three, pp. 282-285, 304 (2002).

ITU, "Draft new Recommendation X.86 (X.eos) on Ethernet over LAPS," retrieved online at http://www.ieee802.org/3/ad_hoc/etholaps/public/docs/3203R1.pdf (2000).

MetroEthernet Forum "Metro Ethernet Networks- A Technical Overview", retrieved from http://www.metroethernetforum.org/MEFTechOverviewWhitePaper071102.pdf ; pp. 1-5 (Jul. 2002).

Resilient Packet Ring Alliance "Outline of the IEEE 802.17 RPR Draft Standard, Version 0.3", retrieved from http://www.rpralliance.org/articles/80217Outline.pdf ; pp. 1-6 (Jun. 2002).

Takefman, Mike, "RPRSG Summary," IEEE 802.17 RPRWG retrieved online at http://grouper.ieee.org/groups/802/17/documents/presentations/jan2001/rprsg_summary.pdf (2001).

Vijeh, Nader, "IEEE 802 Compatibility Considerations," Lantern Communications, retrieved online at http://www.ieee802.org/17/documents/presentations/jul2000/lan_802_comp.pdf, (2000).

Japanese Office Action for Application No. 2003-526066, dated Apr. 1, 2008.

Supplementary European Search Report for Application No. EP02757582, dated Apr. 4, 2006.

* cited by examiner

SYSTEM AND METHOD FOR SUPPORTING SDH/SONET APS ON ETHERNET

RELATED APPLICATIONS

This application claims priority to co-pending U.S. patent application Ser. No. 10/235,174, filed Sep. 4, 2002, which claims priority to U.S. Provisional Application No. 60/317,035, filed Sep. 4, 2001, for all subject matter common to both applications. The disclosures of both said applications are hereby incorporated by reference herein in their entirety.

FIELD OF THE INVENTION

The present invention relates generally to network switching architecture and more specifically to supporting SDH/SONET Automatic Protection Switching (APS) functionality in an Ethernet network.

BACKGROUND OF THE INVENTION

SDH/SONET (Synchronous Digital Hierarchy/Synchronous Optical Network) standards evolved originally for use in a voice network. SDH is a European version of a standard that is substantially the same as the SONET standard developed in North America. SDH/SONET contains connection oriented synchronous TDM circuit switching technology. The SDH/SONET configured network runs at the same clock domain (e.g., every section of the network can be traced to a primary clock reference). The network allocates fixed bandwidth time slots for each circuit. The SDH/SONET architectures are connection based protocols in that there is a physical circuit arrangement between ports in a switch to establish an end to end path. The digital transitions in signals traveling through an SDH/SONET network occur at the same rate, however there may be a phase difference between the transitions of any two signals caused by time delays or jitter in the transmission system.

Ethernet evolved primarily as a data network. In contrast to SDH/SONET, Ethernet is a connectionless asynchronous Carrier Sense, Multiple Access with Collision Detection (CSMA/CD) packet switching technology. The Ethernet architecture does not rely on a single clock domain like the SDH/SONET architecture. The Ethernet architecture sends a series of packets across the network containing data. Whenever a packet needs to be sent, the transmitter will try to transmit the packet. The Ethernet architecture is also connectionless in that the packets travel from node to node within the network without establishing a logical or physical circuit. The end to end path is discovered through a process called "Bridging". Ethernet is fundamentally a Local Area Networking (LAN) technology.

SDH/SONET networks provide reliable, guaranteed available bandwidth, low jitter connections. These characteristics are required for voice quality networks. SDH/SONET, however, is bandwidth inefficient and has a higher overhead that many other network architectures. Ethernet networks, in contrast, provide lower reliability best effort delivery, and low cost bandwidth connections. These characteristics are suitable for data quality networks. Ethernet has non-guaranteed transmission and low overhead and supports fewer operational functions than SDH/SONET. In SDH/SONET, once the circuit is established, bandwidth is allocated for an application and cannot be used by any other application, even if the original application is not using the bandwidth. In Ethernet, applications only use bandwidth when they need the bandwidth to transmit packets.

In SDH/SONET networks, Automatic Protection Switching (APS) functionality is known. SDH/SONET standards define APS controller as the "part of a node that is responsible for generating and terminating information carried in the APS protocol and implementing the APS algorithm." SDH/SONET standards also define APS signaling protocol and APS (K1/K2) bytes. SDH/SONET standards also define various algorithms for linear, ring and mesh protection. SDH/SONET APS functionality can support 50 ms switchover, unidirectional and bi-directional switchover, revertive and non-revertive switchover, manual or automatic switchover. SDH/SONET APS functionality can also support linear, ring, and mesh topologies, and Line and Path protections. The APS feature enables the switchover of circuits in case of circuit failure and is often utilized in optical network systems. In general, the APS feature organizes a network into a collection of "working" interfaces and "protect" interfaces. When a working interface fails, a protect interface immediately assumes the working interface traffic load. In APS there is a working port/link and a protect port/link. Upon initialization and full functioning of a network system, the working port/link is active and the protect port/link maintains a standby mode. If there is an equipment failure during operation, the protect port/link becomes the active port/link, taking over for the failed working port/link, i.e., the protect port/link becomes the new working port/link. Under known APS systems, there can be a minimal traffic disruption during the switchover, on the order of less than 50 ms.

In voice networks, SDH/SONET APS Standard functionality provides the architecture for protection in under 50 ms from equipment failure for ring, linear, or mesh topologies. In order for data networks to be able to support voice traffic, the network must be able to provide the same level of protection both in terms of time to recover and working with different network topologies, i.e., support rings and linear topologies. Ethernet is the most common data network data link layer protocol. There is no Ethernet standard to provide APS functionality.

In Ethernet networks, several standards and proprietary technologies support link failure. Spanning Tree Protocol (STP) IEEE 802.1D standard provides topology changes. STP calculates and maintains the topology by sending and listening to Configuration Messages and several timers. These Configuration Messages are emitted every time a "Hello Timer" times out. Typical this is set to 2 seconds. This means that STP cannot support 50 ms recovery as required for link APS SDH/SONET standard. As the number of nodes grows larger in a STP domain, STP convergence also slows down considerably. It can take minutes to converge. Because of polling, STP also consumes some bandwidth. STP was mainly designed for loop resolution, and original assumptions were that topology changes would be infrequent. STP did not place more emphasis to quick recovery from failures. In data networks, quick recovery is most often not a requirement.

Link Aggregation (LA) IEEE 802.3ad standard is designed to support aggregated links. One of the features Link Aggregation is the support of the possibility of one of the physical link failure in the aggregated link. A Link Aggregation Control Protocol (LACP) is defined "to automatically configure and maintain aggregations among cooperating systems." These messages are emitted on a regular, periodic basis. Typically, the period is every second for fast rate and every 30 seconds for slow rate. This means that Link Aggregation also does not support 50 ms recovery. Before the standard was formalized there were several proprietary implementations of link aggregation, most notably Fast EtherChannel product developed by Cisco Systems.

Recently several proprietary technologies have evolved to accomplish the 50 ms second recovery requirement for carrier networks. These technologies can be classified into two main categories: Ethernet based and new non-Ethernet based. In Ethernet based systems most technologies use 20 ms based "Heartbeat" or "Hello" protocol polling to detect link failure along with upper layer software to recover within 50 ms. Atrica's Atrica Resilient Ethernet Access (AREA) framework technology is an example of that. Occam Networks Ethernet Protection Switching (EPS) technology is also an example. Internet Photonics uses interframe gap in Ethernet to support similar functionality.

There are other Ethernet efforts in progress that are also trying to solve the fast recovery problem. Rapid Spanning Tree Protocol (RSTP) IEEE Committee is working on modifications to STP, but currently, there is a requirement of 1 second guaranteed convergence/recovery, not 50 ms. Ethernet First Mile IEEE Committee is also working on modifying Ethernet to support 50 ms recovery.

Non Ethernet based technologies being defined include Metro Ethernet Forum, which uses Multi Label Protocol Switching (MPLS) to support protection. Resilient Packet Ring (RPR) technology is being defined by RPR Alliance. RPR is a new protocol that is not compatible with Ethernet protocol, but is designed to support 50 ms recovery in rings.

Most of the above mentioned technologies solve limited functionality for Ethernet. Typically, they support 50 ms protection either in a linear or ring environment, but not both. In addition, they are limited to link failures. They address only a subset of the capabilities as defined by the SDH/SONET APS standard.

SUMMARY OF THE INVENTION

There is a need in the art for APS functionality on an Ethernet network as defined by the SDH/SONET APS standard. The present invention is directed toward further solutions to address this need.

In accordance with one example embodiment of the present invention, Media Access Control (MAC) hardware for supporting MAC Automatic Protection Switching (APS) functionality has a MAC APS Control sublayer and a plurality of MAC sublayers.

In accordance with example aspects of the present invention, the plurality of MAC sublayers further includes a Link Aggregation sublayer. The plurality of MAC sublayers can further include at least one MAC Control sublayer. The MAC APS Control sublayer can be located within a MAC. A MAC Control Layer can process optional VLAN tags in control frames. The MAC APS Control sublayer can be implemented in MAC hardware. The MAC APS Control sublayer supports APS for logical links formed by a Link Aggregation sublayer. The MAC APS Control sublayer supports APS for physical links. The MAC APS Control sublayer supports APS for Network Layer paths. A MAC sublayer can be implemented in at least one of an Ethernet Switch device and an Ethernet MAC device. The MAC APS Control sublayer processes an Ethernet MAC control APS frame. The MAC APS Control sublayer maintains an Ethernet MAC Control APS state.

In accordance with further aspects of the present invention, a MAC APS Control Layer generates an interrupt when an APS frame is detected to invoke a MAC Client APS Controller. A MAC APS Control sublayer generates an interrupt when an APS state change is detected to invoke a MAC Client APS Controller. The MAC APS Control sublayer interacts with an Ethernet MAC Client APS Controller.

In accordance with another aspect of the present invention, an Ethernet PHY hardware device includes at least one physical sublayer. One of the at least one physical sublayers generates an interrupt when a port/link failure is detected to invoke a MAC Client APS Controller.

In accordance with another aspect of the present invention an Ethernet MAC APS Control Frame for supporting SDH/SONET APS Signalling Protocol includes a standard Ethernet frame Preamble field. Further elements of the Control Frame include a standard Ethernet Start-of-Frame Delimiter field, a standard Ethernet Destination MAC address field, a standard Ethernet Source MAC address field, an optional standard Ethernet VLAN Tag field, a standard Ethernet Type field, a standard Ethernet MAC Control Opcode field, a plurality of standard Ethernet MAC Control Parameters being opcode specific, and a standard Ethernet Frame Check Sequence field.

In accordance with further aspects of the present invention the Ethernet MAC Control Opcode further includes an ability to distinguish between a logical link failure, a physical link failure, and a path failure. In addition, the plurality of Ethernet MAC Control Parameters further include a K1 Word field containing an SDH/SONET K1 byte, a K2 Word field containing an SDH/SONET K2 byte, a Port ID field, a Slot ID field, a Chassis ID field, a Bridge ID field, a Node ID/IP field, and a Reserved field containing zero or more octets of zero value.

In accordance with further aspects of the present invention, an Ethernet MAC Client includes at least one MAC Client. The MAC Client includes at least one of a network layer protocol and a forwarding function for switches. The MAC Client can also include at least one MAC Control Client APS Controller.

In accordance with another aspect of the present invention, a method of providing APS functionality on MAC hardware and PHY hardware includes detecting a failure along a first link on a near end network node. A Physical Layer generates an interrupt when a port/link failure is detected to invoke a MAC Client APS Controller. A switch is made to a second link to correct the failure. The method can execute within 50 ms to provide recovery functionality.

In accordance with another aspect of the present invention, a method of providing APS functionality on MAC hardware includes a near end MAC APS Control sublayer receiving a MAC APS Control Frame containing an APS request from a MAC APS Control Frame buffer. The near end MAC APS Control sublayer updates MAC APS state hardware registers to reflect receipt of the APS request. The MAC APS hardware provides maskable interrupts for MAC APS Control Frames received. The near end MAC APS Control sublayer generates interrupts to invoke the APS Controller. The APS Controller processes the APS request. The APS request can include at least one of a switchover request and an APS management request using APS K1/K2 signaling protocol. At least one of manual and automatic switchover APS requests are possible. The method can further include distinguishing between a logical failure, a physical failure, and a path failure. The method can execute within 50 ms to provide recovery functionality.

In accordance with another aspect of the present invention, a method of providing APS functionality on MAC hardware device includes a near end MAC APS Control sublayer receiving APS Controller requests to be transmitted. The MAC APS Control sublayer creates an APS Control frame with requested control parameters. The near end MAC APS Control sublayer transmits the MAC APS Control frame. The APS Controller requests can include at least one of a switchover request and an APS management request using APS K1/K2 signaling protocol. The APS Controller requests can also include at least one of a manual and automatic switchover APS request. The method can execute within 50 ms to provide recovery functionality.

In accordance with another aspect of the present invention, a method of providing APS functionality on an Ethernet protocol network includes experiencing a failure along a first port/link. An interrupt is generated. The interrupt is forwarded to an APS controller. The APS controller initiates a switch from the first port/link to a second port/link. The method can execute within 50 ms to provide recovery functionality.

In accordance with another aspect of the present invention, a method of providing APS functionality on an Ethernet protocol network includes receiving an APS Control frame with an APS request. The APS Control frame APS request is processed. An interrupt is generated. The interrupt is forwarded to an APS Controller, the APS Controller processing the APS request received. The method can execute within 50 ms to provide recovery functionality. In addition, the method can provide support for standard SDH/SONET APS functionality for linear, ring, and mesh topologies for Ethernet protocol networks using SDH/SONET K1/K2 bytes for SDH/SONET APS Signaling protocol.

In accordance with another aspect of the present invention, a method of providing APS functionality on an Ethernet protocol network includes receiving an APS request from an APS Controller Client. An APS Control Frame is created with the APS request. The APS Control Frame is transmitted. The method can execute within 50 ms to provide recovery functionality. The method can further provide support for standard SDH/SONET APS functionality for linear, ring, and mesh topologies for Ethernet protocol networks using SDH/SONET K1/K2 bytes for SDH/SONET APS Signaling protocol.

In accordance with another example embodiment of the present invention, an Ethernet PHY hardware device for supporting Ethernet MAC SDH/SONET Automatic Protection Switching (APS) functionality for managing protection from failures and recovery from failures on an Ethernet network is provided. The device includes at least one Ethernet PHY sublayer stored on the Ethernet PHY hardware device configured to monitor working and protect channels and generate an interrupt upon detection of a hard failure or a soft failure. Upon detection of port failures or link failures the at least one Ethernet PHY sublayer generates the interrupt to invoke an Ethernet MAC Client APS Controller configured to generate and terminate APS requests on working and protect channels to manage protection of working and protect channels from failures and recovery from failures on the Ethernet network. The Ethernet PHY hardware device is configurable for use with a plurality of different network topologies to manage protection from hard or soft failures and recovery from hard or soft failures on the Ethernet network using the at least one Ethernet PHY sublayer.

In accordance with another example embodiment of the present invention, a method of providing SDH/SONET APS functionality on an Ethernet MAC hardware device and an Ethernet PHY hardware device by managing protection from failures and recovery from failures for an Ethernet Network begins with detecting a soft failure or hard failure along a first link on a near end network node of a working or protect channel. The method continues with a PHY sublayer stored in the PHY hardware device generating an interrupt when a soft failure or hard failure is detected to invoke a MAC Client APS Controller. The failure is corrected by switching to a second link. The Ethernet MAC hardware device and the Ethernet PHY hardware device are configurable for use with a plurality of different network topologies to manage protection of working and protect channels from soft failures or hard failures and recovery from soft failures or hard failures on an Ethernet network. Furthermore, the Ethernet MAC hardware device includes a MAC APS Control sublayer and a plurality of Ethernet MAC sublayers supporting SDH/SONET APS functionality and configured to process a MAC control frame stored on the Ethernet MAC hardware device.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION

Figure 1A:
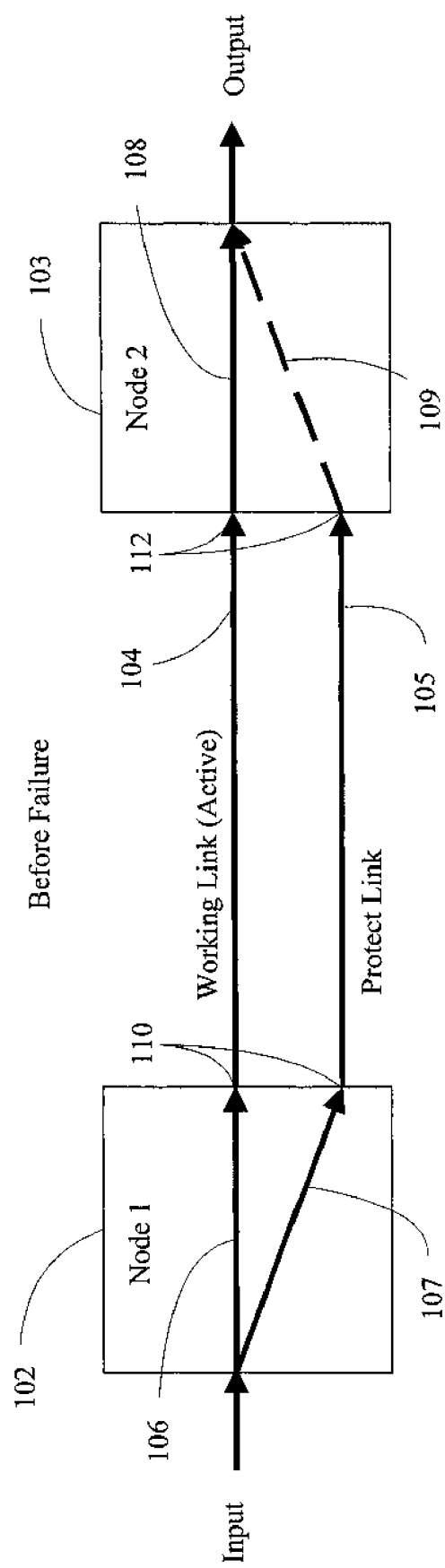
FIGS. 1A and 1B illustrate the switching of a path using APS according to one aspect of the present invention.

Illustrative embodiments of the present invention relate to the implementation of standard SDH/SONET APS functionality within an Ethernet architecture. In order to support SDH/SONET APS functionality in the Ethernet architecture, the present invention extends the Ethernet MAC Control Sublayer. The Ethernet MAC Control sublayer is a sublayer of the data link layer (Layer 2, described later herein). The MAC Control sublayer resides between the MAC (the Media Access Control, which is an entity or algorithm utilized in negotiating access to a shared or dedicated communications channel) and a client of that MAC (where the client is typically a network layer protocol or a relay function implemented by bridges or switches). The clients of the MAC can use the MAC Control sublayer to control the operation of the Ethernet MAC. The implementation of MAC Control sublayer is optional under Ethernet standards.

Aspects of the present invention include an Ethernet MAC APS Control Protocol, which can be used to support Ethernet MAC APS. The Ethernet MAC APS Control Protocol extends the MAC Control sublayer to make use of Ethernet MAC multicast or unicast addresses, and MAC Control opcodes to support the APS function. The MAC APS function implements SDH/SONET APS on full duplex Ethernet links. The MAC APS frame contains the K1/K2 bytes as described by the SDH/SONET APS standards. The MAC APS also operates in a same manner to the known SDH/SONET APS. An APS Controller can be the client for the Ethernet MAC APS Control sublayer. The APS Controller uses the Ethernet MAC APS infrastructure provided in accordance with aspects of the present invention to implement standard APS functionality.

FIGS. 1 through 6, wherein like parts are designated by like reference numerals throughout, illustrate example embodiments of methods for implementing SDH/SONET APS in an Ethernet environment, according to the present invention. Although the present invention will be described with reference to the example embodiments illustrated in the figures, it should be understood that many alternative forms can embody the present invention. One of ordinary skill in the art will additionally appreciate different ways to alter the parameters of the embodiments disclosed, such as the size, shape, or type of elements or materials, in a manner still in keeping with the spirit and scope of the present invention.

In order to appreciate operation of the illustrative embodiments described herein, it is helpful to understand the Open Systems Interconnect (OSI) network hierarchy, which views a network as being composed of several hierarchical layers. In the hierarchy, Layer 1 is the physical layer containing elements that perform the transmission of signals within the network. Layer 2 is the data link layer, which provides services that allow direct communication between devices across the underlying physical channel of Layer 1. Layer 3 is the network layer, which is responsible for station-to-station data delivery over multiple data links. The network layer is responsible for the routing of packets across the network. Layer 4 is the transport layer, which provides an error-free, sequenced, guaranteed delivery, message service that allows process to process communication between stations on a network. Layer 5 is the session layer, which deals with the establishment of communications between applications. This layer is useful for security applications. Layer 6 is the presentation layer, which enables the sharing of data between networked systems using different methods of local data representation. Finally, Layer 7 is the application layer. This layer provides generic application functions, such as email, file transfer capability, and the like.

In SDH/SONET, APS provides port/line protection between nodes at a physical layer (i.e., Layer 1). Several topologies can support APS (i.e., ring, linear, or mesh topologies) and several levels of protection are possible (i.e., 1+1, N+1, and N:1). For the purpose of the following description, APS is illustrated using 1+1 APS configuration between nodes. N+1 and N:1 APS configurations can be supported by the same architecture. The APS "1+1" architecture generally arranges two lines or paths, with information propagating down each line or path at the same time. The connection can be bi-directional or unidirectional. In addition, the "1+1" architecture provides for a protect interface, or circuit, paired with each working interface, or circuit. Often, the protect and working circuits interface with an add/drop multiplexer, which sends the same traffic load to the working and protect circuits.

Within the protect circuit, information indicating the current status of the APS connection travels through the circuit continuously and conveys any requests for action. This information can be used to synchronize the working and protect circuits.

The present invention can support linear and ring protection, ring and mesh topology, and provides physical links, logical links, and path protection. However, for purposes of clarity in describing the invention, the description contained herein utilizes a linear APS configuration. One of ordinary skill in the art will appreciate that ring and mesh topology protection can also be implemented in accordance with aspects of the present invention. Path level protection can also be supported by the architecture of the present invention by providing the appropriate source and destination Ethernet MAC addresses.

Figure 1B:
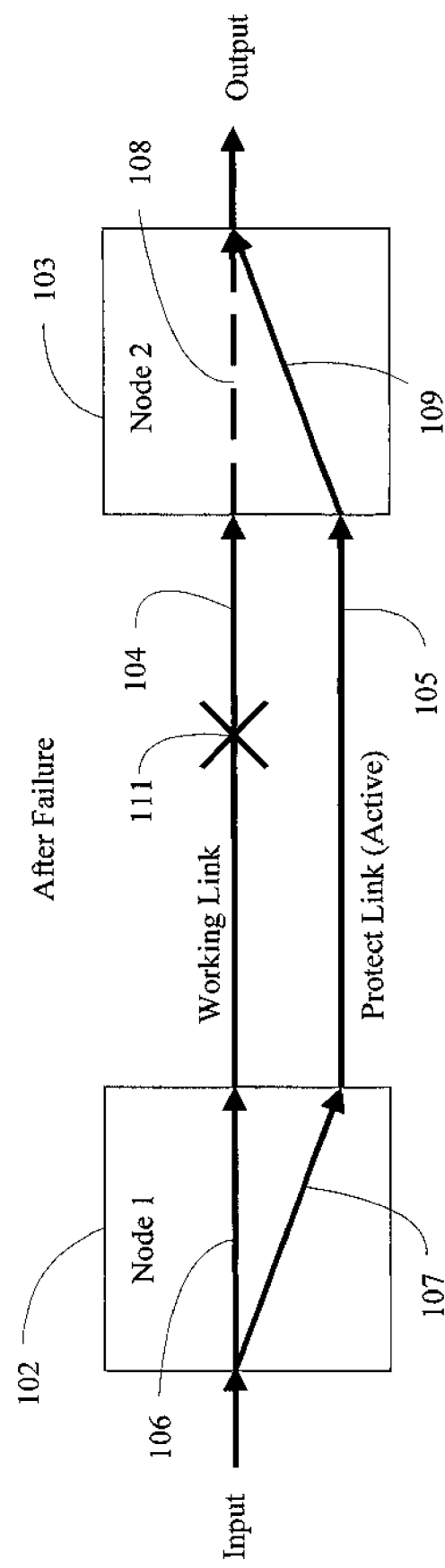

FIGS. 1A and 1B illustrate an APS configuration between two nodes. There are two network elements or nodes, a first node 102 and a second node 103. The first node 102 has a first fiber pair extending along a first link 104 and the second node 103 has a second fiber pair extending along a second link 105. The first link 104 and the second link 105 connect the first and second nodes 102 and 103 respectively at a first APS port pair 110 and a second APS port pair 112. Inside each node 102 and 103, there are connections 106, 107, 108, and 109 between ingress and egress ports of the nodes 102 and 103. The solid line arrows represent active traffic, while the dashed line arrows represent standby traffic. For simplicity, FIGS. 1A and 1B only show traffic flowing in one direction. In the case of bi-directional architecture, the other direction has the same traffic pattern in the opposite direction from the arrows illustrated. FIGS. 1A and 1B show before and after states of the APS traffic (i.e., before a line interruption and after a fiber has been cut at fiber cut 111, causing a line interruption).

In APS, as shown in FIGS. 1A and 1B, one link (104 or 105) is protected by another link (104 or 105) to anticipate and address various kinds of failures. These failures can include equipment failures such as node failures, card failures, and port failures, or link failures, such as a cable/fiber cut. These errors are commonly known as hard failures. A second category of errors called soft failures includes instances when significant bit error rates occur on a link.

The first link 104 supports the working port/link, which extends between the first node 102 and the second node 103. The second link 105 supports the protect port/link, which also extends between the first node 102 and the second node 103. The determination of which link 104 or 105 is active as the working port/link and the protect port/link depends upon the state of the APS controller on nodes 102 and 103. In FIG. 1A, the first link 104 is the active working port/link. The frames of data are transmitted to both a first working connection 106 and a first protect connection 107. The transmission of the frames is known as bridging. The frames of data propagate along the working port/link of the first link 104 and the protect port/link of the second link 105. The frames of data then transition through the second node 103 along an active second working connection 108, but do not propagate through a standby second protect connection 109. A selector can select which path is used for receiving frames. Bridging and Selector can be implemented using hardware which supports dual casting, such as Y connectors for electrical interfaces, 2×2 cross connect switch chips for electrical or optical interfaces. Serial bus architecture can also be used.

When a failure occurs on the working port/link along the first link 104, for example due to the fiber cut 111 of FIG. 1B, a receiver (not shown) in the second node 103 detects the link failure in hardware and causes an interrupt for the MAC APS Client, which in turn initiates a switchover to the protect port/link of the second link 105. The second working connection 108 enters a standby condition, and the second protect connection 109 becomes active. The frames of data can then continue between the first node 102 and the second node 103, by propagation along the protect port/link of the second link 105 from the first protect connection 107 to the second protect connection 109 of the second node 103.

Figure 2:
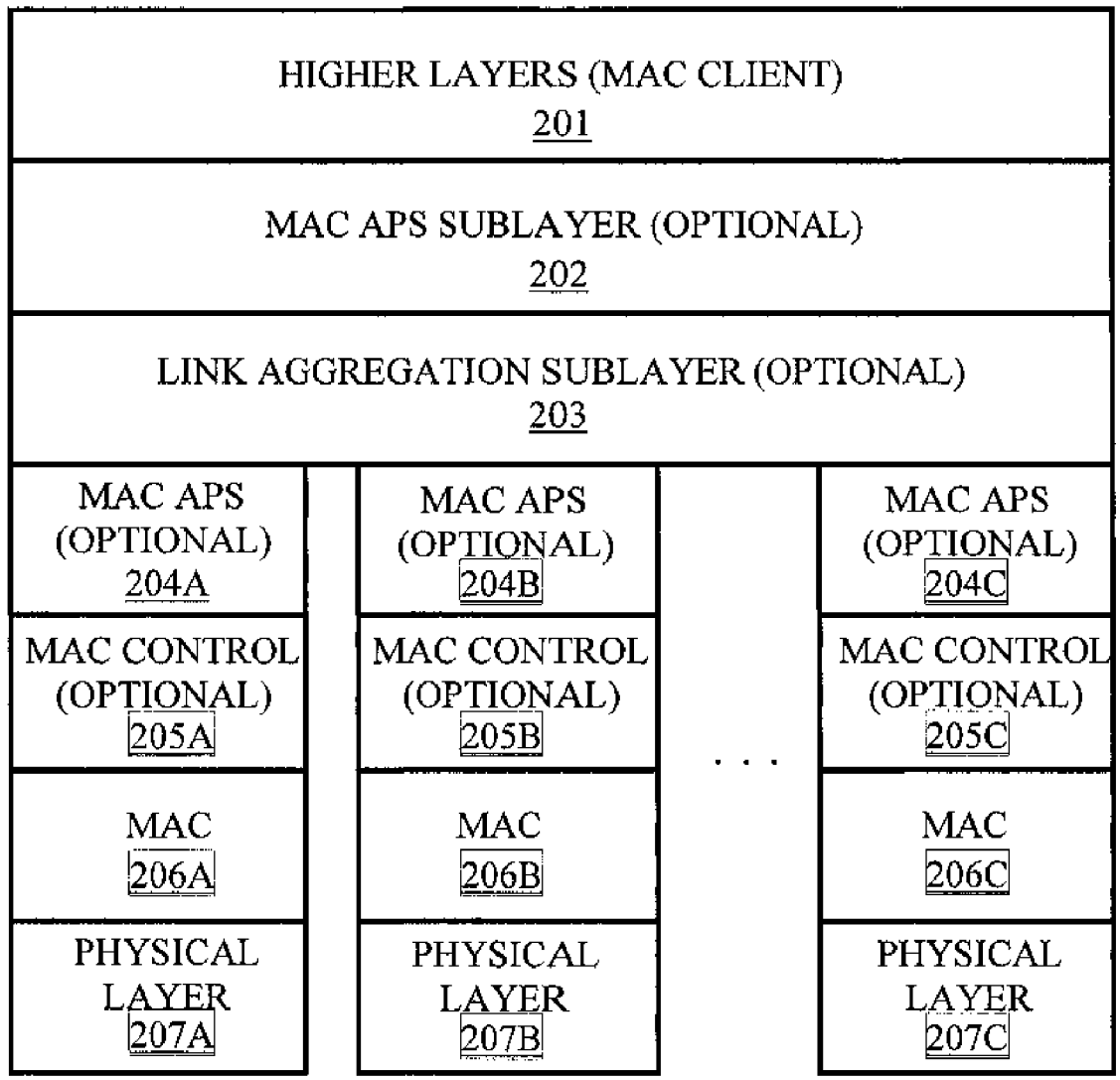
FIG. 2 is a diagrammatic illustration of an Ethernet MAC APS Control architecture according to one embodiment of the present invention.

FIG. 2 shows an Ethernet MAC APS Control Architecture. The MAC Client or Higher Layers 201 can be, e.g., a network layer protocol, such as IP, or a forwarding function for switches. In the illustrated embodiment, the MAC Client 201 also implements the APS Controller functionality. The APS Controller in the MAC Client 201 manages the state of the APS and reacts to various errors or commands to switchover.

A MAC APS Control sublayer 202 supports APS for logical links formed by Link Aggregation sublayer 203. The Link Aggregation sublayer 203 allows a plurality of physical links to be aggregated into one aggregated link. An aggregated link is one form of a logical link. In addition, MAC APS Control sublayers 204A, 204B, and 204C support APS for physical links. Standard MAC Control sublayers 205A, 205B, and 205C, support all the currently defined MAC control frames, e.g., PAUSE frames, which prevent switches from unnecessarily discarding data frames due to input buffer overload. All of the MAC Control sublayers 205A, 205B, and 205C are optional. A standard MAC sublayer 206A, 206B, and 206C, controls access to media. A standard PHY sublayer 207A, 207B, and 207C, implements physical layer signals for transmission media.

For SDH/SONET APS to support bi-directional switchover, preemption, and several other APS features, SDH/SONET APS requires support of APS K1/K2 signaling protocol. K1/K2 signaling protocol relates to the actual bytes used in SDH/SONET signaling. More specifically, the K1 byte and the K2 byte in the SDH/SONET architecture are used for protection signaling between line terminating entities for bi-directional automatic protection switching, and for detecting alarm indication signals (AIS-L) and remote defect indication signals (RDI).

The MAC Control Sublayer extends to provide APS functionality by enabling Ethernet to support K1/K2 signaling protocol. The MAC Control sublayer also extends to provide optional support of VLAN tags for MAC control frames. Aspects of the present invention introduce the Ethernet MAC APS Control sublayers 202, 204A, 204B, and 204C, as shown in FIG. 2. The Ethernet MAC APS Control sublayers 202, 204A, 204B, and 204C, include an Ethernet MAC Control APS frame, which contains the K1/K2 bytes in accordance with definitions of the K1/K2 bytes in the known SDH/SONET standards. The MAC APS sublayer 202 can support MAC APS at Link Aggregation sublayer 203 (logical network interface layer) and/or physical network interface layer 204A, 204B, and 204C. It should be noted that the same physical hardware can be used to process the APS signaling protocol for the MAC APS sublayer 202, 204A, 204B, and 203C.

APS in Ethernet can be implemented at the physical layer (Layer 1) like SDH/SONET in the framing process by modifying the framing or using interframe gaps for APS signaling protocol, or it can be implemented in the Ethernet MAC Control sublayer like the PAUSE function or Link Aggregation function known in the art. Modifying Ethernet framing to implement APS would not be backward compatible and would be difficult to standardize through the end users and industry. Also, modifying Ethernet framing would be only a partial solution because Ethernet frames are only transmitted when there is data to be sent. If there is no data to be sent, there is no Ethernet frame to carry APS signals. Contrarily, in SDH/SONET, frames are continuously generated (data or idle). Therefore, implementing APS at the Ethernet MAC Control sublayer allows the APS signaling to be event and packet driven in a natural Ethernet manner.

Figure 3:
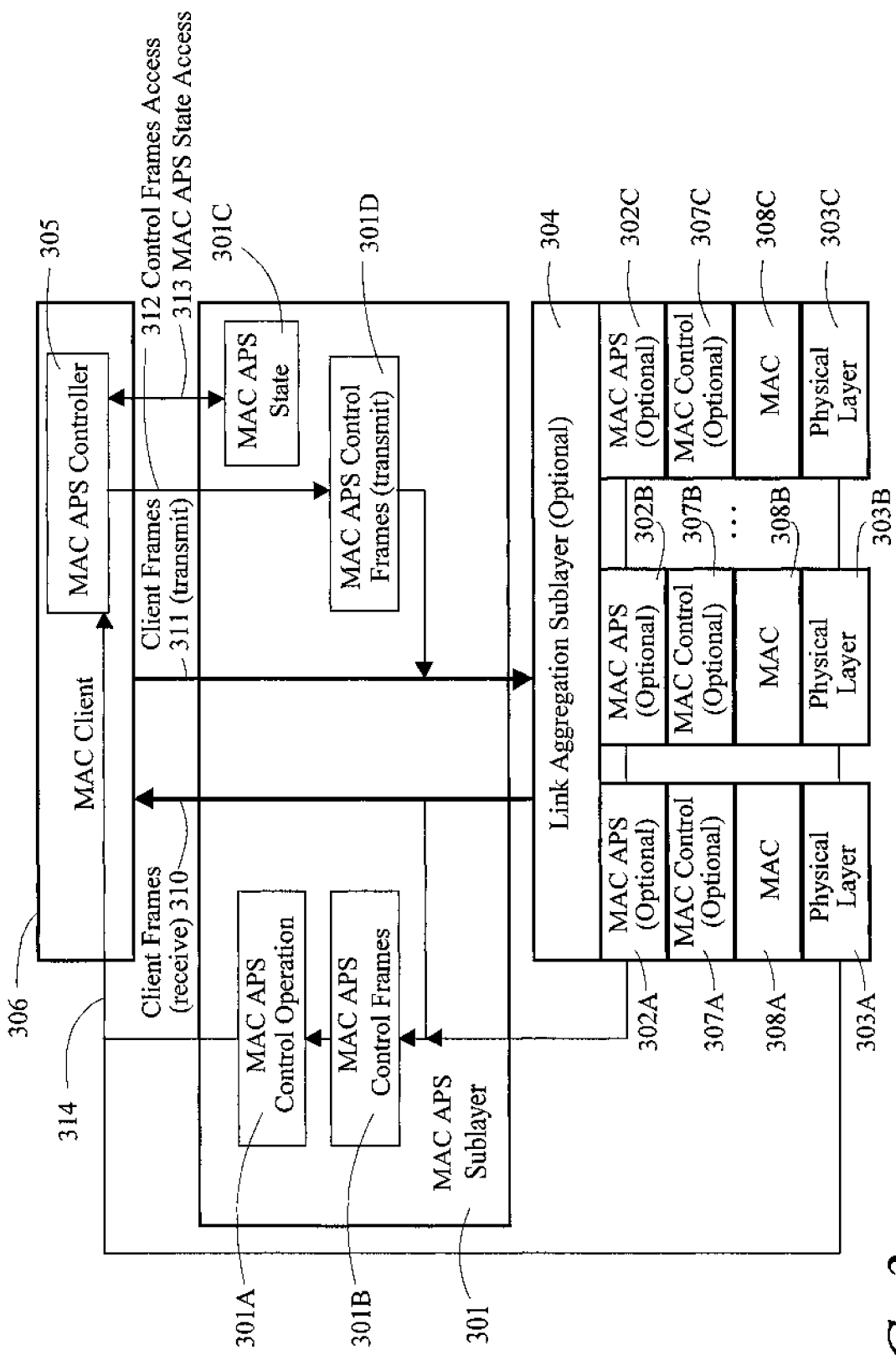
FIG. 3 is a diagrammatic illustration of an Ethernet MAC APS Control sublayer internal architecture according to one aspect of the present invention.

FIG. 3 shows the Ethernet MAC APS Control sublayer internal architecture. Again, MAC Client or Higher Layers 306 can be a network layer protocol, such as IP, or a forwarding function for switches. In the illustrated embodiment, the MAC client 306 again implements MAC APS Controller 305 functionality. The MAC APS Controller 305 manages the state of the APS and reacts to various errors or commands to switchover.

A MAC APS Control sublayer 301 supports APS for logical links formed by a Link Aggregation sublayer 304. The Link Aggregation sublayer 304 allows many physical links to be aggregated into one logical link. MAC APS Control sublayers 302A, 302B, and 302C support APS for physical links. Standard MAC Control sublayers 307A, 307B, and 307C, support all of the currently defined MAC control frames, e.g., PAUSE frames. All the MAC Control sublayers are optional. Standard MAC sublayers 308A, 308B, and 308C control access to the media. Standard PHY sublayers 303A, 303B, and 303C, implement physical layer signals for transmission media.

The MAC APS Control sublayer 301 includes a MAC APS Control operation 301A, which manages a MAC APS state 301C based on MAC APS Control frames received from MAC APS Control Frame buffers 301B. The MAC APS Control operation 301A also generates an interrupt along line 314 when there is a change in APS K1/K2 state. The MAC APS Controller 305 can access the MAC APS State 301C. The MAC APS State 301C contains various interrupt status registers, K1/K2 byte state registers, APS opcode received, and other APS related information. The MAC APS Controller 305 can also transmit MAC APS Control Frames from MAC APS Control Frame buffers 301D and built by the MAC APS Controller 305 by setting up registers in the MAC APS State 301C.

As shown in FIG. 3, the Ethernet MAC Architecture is modified to support MAC APS Control sublayers 301, 302A, 302B, and 302C. The Ethernet MAC architecture supports APS processing in the MAC APS Control Operation 301A of MAC APS Control Frame buffers 301B and 301D, maintains MAC APS State 301C, and generates interrupts along interrupt line 314 when a MAC APS Control Frame has been received and/or if there has been a change in APS state at the MAC APS State 301C.

The Ethernet hardware supports interrupts from Physical Layers 303A, 303B, and 303C from hard failures due port failures or link failures. Similarly, the Ethernet hardware can be extended to support soft failures, such as error rates greater than predetermined configured thresholds. The Ethernet hardware provides additional registers at the MAC APS State 301C for higher Layers and the MAC APS Controller 305 to access, via the access line 313, the current state of APS, such as K1/K2 bytes, and the like.

The dedicated MAC APS Control Frame buffers 301B and 301D receive and transmit, respectively, the MAC APS Control Frames. The existence of the MAC APS Control Frame buffers 301B and 301D prevents head of queue blocking of the control frame so that a link switchover can occur within 50 ms, in accordance with the SDH/SONET standard. The Ethernet hardware can additionally provide separate control and maskable status registers for APS functionality in the MAC APS State 301C. The MAC APS Control Frames (transmit) from the MAC APS Control Frame buffer 301D can be accessed by the MAC APS controller 305 using hardware path 312. The access can be implemented as registers or via direct access to the MAC APS Control Frame buffer 301D. The received data frames directly pass along the Client Frames receive path 310 to the MAC client 306. The MAC Client 306 transmit data frames path 311 transmits the MAC Client 306 data frames directly the MAC hardware.

The MAC APS Control sublayer as shown in FIG. 3 can be placed below the Link Aggregation sublayer 304 to protect individual physical links of the MAC APS Control sublayer 302A, 302B, and 302C. Alternatively, the MAC APS Control sublayer can be positioned above the Link Aggregation sublayer 304 to protect logical links. The same architecture supports both cases. Different MAC Control opcodes are utilized to distinguish between each of the different cases.

When a failure is detected locally on a near end node (the node closer to the source of the transmission) the Ethernet PHY layer 303A, 303B, and 303C generates an interrupt along interrupt line 314, which invokes the MAC APS Controller 305 and in turn causes a switchover.

When a failure is detected remotely by a far end node (a node closer to the destination of the transmission) and requests a switchover, it sends a MAC APS Control Frame from the MAC APS Control Frame buffer 301D with the appropriate APS command and information as needed by the K1/K2 bytes. When the MAC APS Control Frame is received at the near end node, the near end MAC Control sublayer 301A, 302A receives the MAC APS Control Frame from the MAC APS Control Frame buffer 301B and updates the MAC APS hardware state/registers at the MAC APS State 301C to reflect the new request. The hardware provides maskable interrupts for MAC APS Control Frames received and if there is change in MAC APS State bytes at the MAC APS State 301C. When such an interrupt occurs it again invokes the MAC APS Controller 305, which executes the APS switchover.

In the transmit direction, the hardware can be implemented such that there are K1/K2 registers at the MAC APS State 301C and when the APS Controller 305 needs to transmit the MAC APS Control Frame it writes to the MAC APS Control Frame buffer 301D via the hardware path 312 of the control registers.

There are several embodiments for implementation of aspects of the present invention in the MAC layer. To distinguish which MAC APS context exists in any one instance, logical versus physical, one of several processes below occurs. One implementation is to use the MAC Control Frames, multicast destination address 01-80-C2-00-00-03, type 0x8808 and three opcodes for Physical APS, Logical APS frames, and Path APS frames. A second implementation can make use of the different frame types instead of opcodes. Alternatively, an embodiment can implement MAC APS as one class of Slow Protocols, as defined in the Ethernet Standards, a class of protocols wherein they never emit more than a specified maximum number of frames per time period. Still, another embodiment includes implementation using vendor specific, multicast destination addresses. One of ordinary skill in the art will appreciate that different combinations of the above embodiments, as well as others not specified, can also be used. One example embodiment, detailed below, shows implementation of the invention with the first option.

Figure 4:
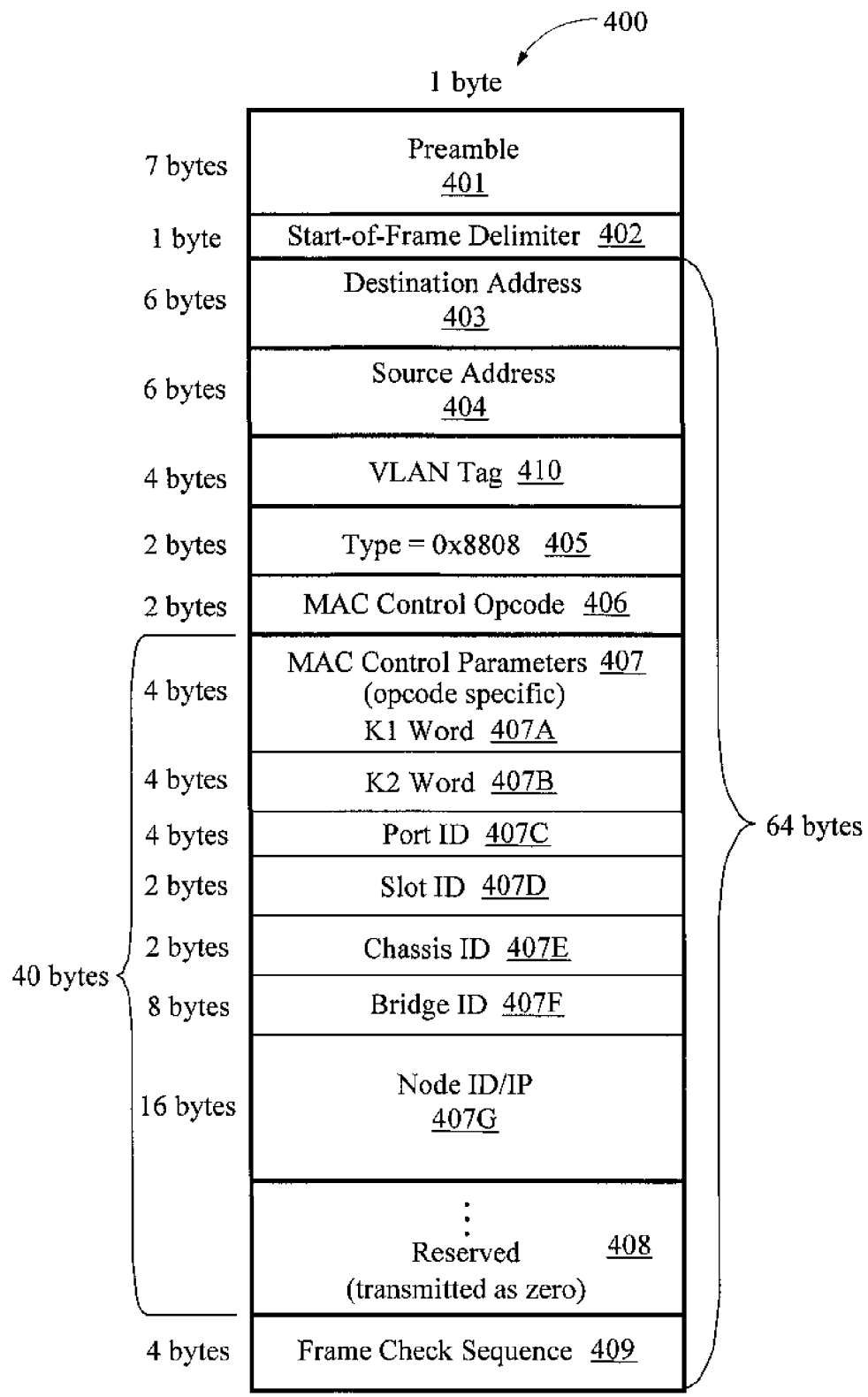
FIG. 4 is a diagrammatic illustration of an Ethernet MAC APS Control Frame format according to one aspect of the present invention.

FIG. 4 shows an example Ethernet MAC APS Control Frame 400 format. All Ethernet frames start with seven bytes of Preamble 401, each containing the value 0x55. A Start of Frame Delimiter (SFD) 402 contains the value 0xD5. A destination address 403 contains the unique multicast address reserved for MAC APS operations: 01-80-C2-00-00-03. This would require registering with the 802 Standards Committee. The destination address 403 can also be the unicast MAC address of the destination port. The destination port would be configured through an external mechanism, such as the system software. The destination address 403 requires six bytes. A source address 404, also requiring six bytes, contains the unicast address of the source interface sending the MAC APS frame. A VLAN tag field 410 is optional and contains standard VLAN Protocol ID 0x8100 in the first two bytes of the field and the second two bytes contain the VLAN Identifier, priority, and Tag Control Info bit. These are defined by the 802.1Q/1p standards. A type field 405 contains the reserved value 0x8808 used for all MAC Control Frames, and requires two bytes. A MAC APS Control Opcode 406 for MAC APS physical link level is 0x0002. The MAC APS Control Opcode 406 for MAC APS logical link level is 0x0003. The MAC APS Control Opcode 406 for MAC APS path level is 0x0004. This would require registering with the 802 Standards Committee. In all instances, the MAC APS Control Opcode 406 requires two bytes. A MAC APS Control Parameters field 407 takes two parameters called K1 Word 407A and K2 Word 407B. These are 4-byte unsigned integer values containing the K1 and K2 bytes of standard SDH/SONET APS. The use of word length allows for growth in the K1 byte and allows more than 16 Station IDs in the K2 byte. Within the MAC APS Control Parameters, additional optional fields exist for Port ID 407C, Slot ID 407D, Chassis ID 407E, Bridge ID 407F and Node ID/IP 407G. These fields can be used for fault isolation in case of path APS protection, and require the bytes illustrated in the figure. External software can use these fields to generate alarms or report the status of where the failure occurred. A Reserved field 408 is maintained for future extensions and is set to all zeros. A Frame Check Sequence (FCS) field 409 is a checksum computed on the contents of the frame from the Destination Address 403 through to the end of the Reserved field 408 inclusively.

Figure 5:
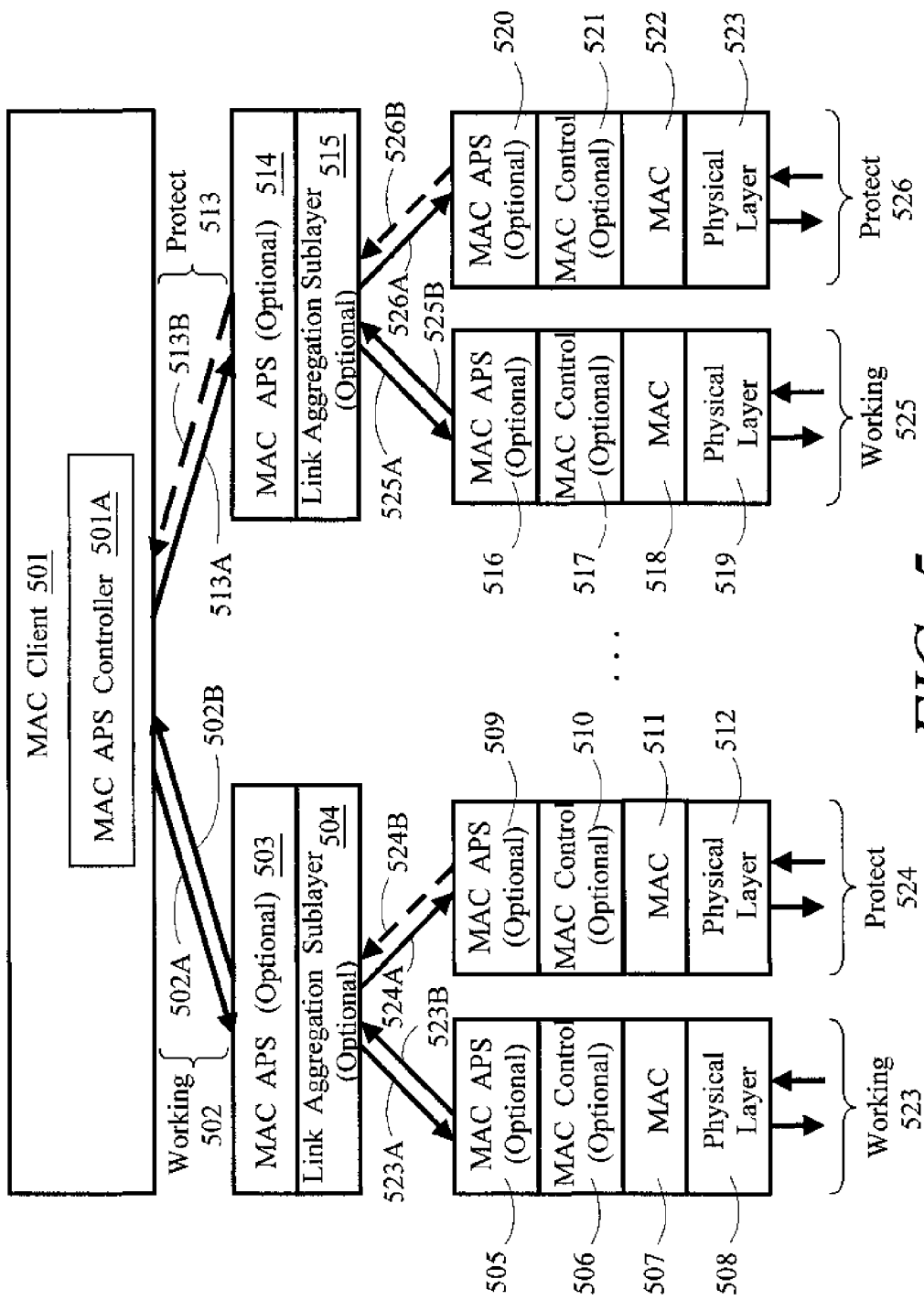
FIG. 5 is a diagrammatic illustration of Ethernet MAC APS Operation according to one embodiment of the present invention.

FIG. 5 illustrates one example implementation of the Ethernet MAC APS Operation. MAC Client or Higher Layers 501 can be a network layer protocol, such as IP, or a forwarding function for switches. In the illustrated embodiment, the MAC client 501 also implements MAC APS Controller 501A functionality. The MAC APS Controller 501A manages the state of the APS and reacts to various errors or commands to switchover. MAC APS Control sublayers 503 and 514 support APS for logical links formed by Link Aggregation sublayers 504 and 515. Link Aggregation sublayers 504 and 515 allow many physical links to be aggregated into one logical link. MAC APS Control sublayers 505, 509, 516, and 520 support MAC APS for physical links. In a next layer is a standard MAC Control sublayer 506, 510, 517, and 521, which supports all the currently defined MAC APS Control Frames, e.g., PAUSE frames. All the MAC Control sublayers are optional. After the MAC Control sublayer is a standard MAC sublayer 507, 511, 518, and 522, that controls access to the media. Next is a standard PHY sublayer 508, 512, 519, and 523, that implements the physical layer signals for the transmission media.

A logical level working link 502 transmit 502A and receive 502B are shown as line arrows representing active traffic. A logical level protect link 513 transmit 513A is shown active and receive 513B is shown in standby mode. Similarly, each of the physical links are illustrated as physical working links 523 and 525, corresponding active transmit links 523A and 525A, and corresponding active receive links 523B and 525B. Physical protect links 524 and 526 are also shown, with corresponding active transmit links 524A and 526A, and corresponding standby receive links 524B and 526B.

The APS operation is as shown in FIG. 5, which shows the case of logical (link aggregation) APS links as working links 502 and protect links 513. FIG. 5 also shows the case of physical APS links as working links 523 and 525, and protect links 524 and 526. The APS Controller 501A follows the same state machines and implements the same commands as standardized in the SDH/SONET standards referenced.

Figure 6:
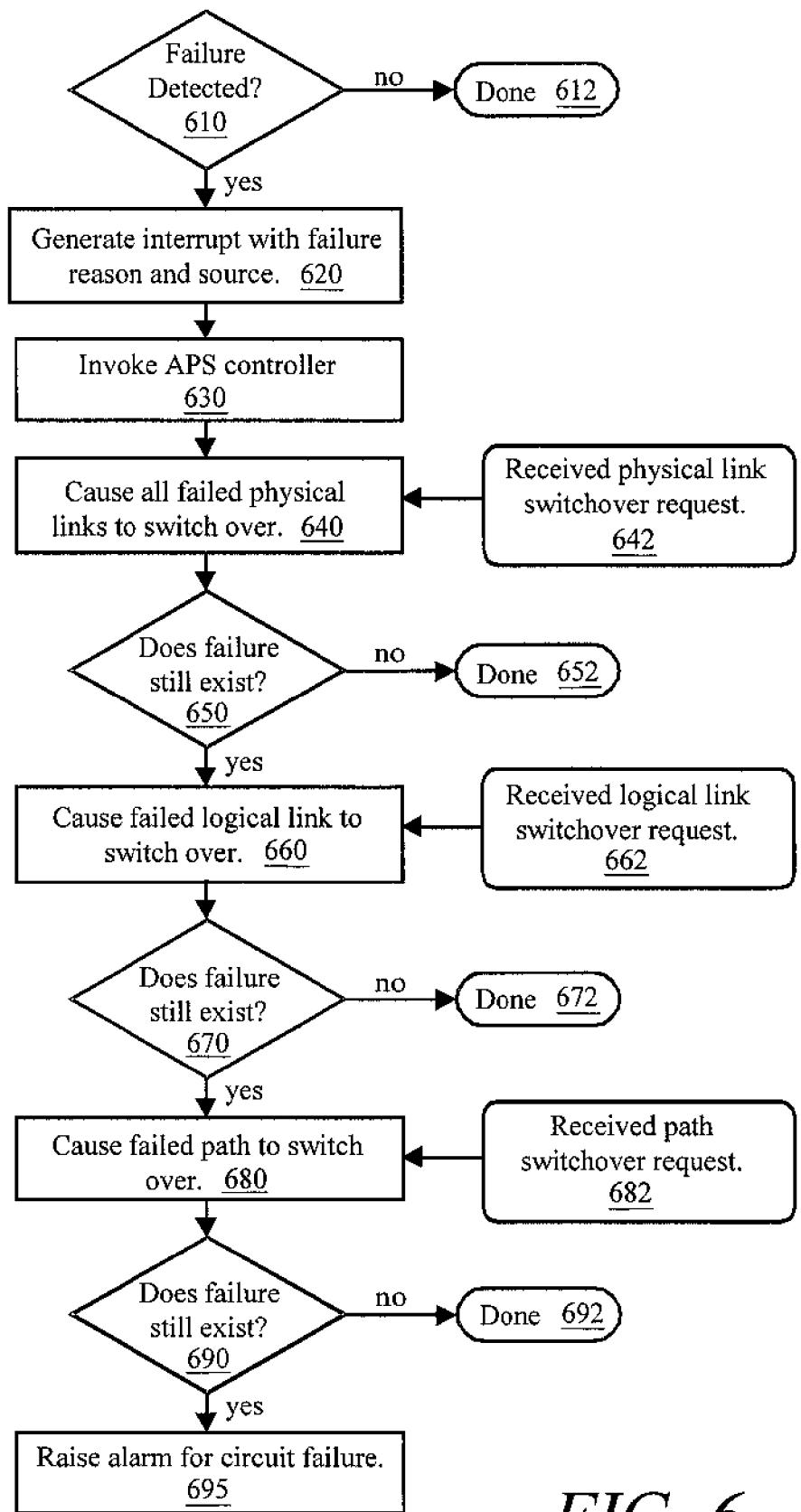
FIG. 6 is a diagrammatic illustration of Ethernet MAC APS Control Flow according to one embodiment of the present invention.

The APS operation control flow is illustrated in FIG. 6 while concomitantly referring to FIGS. 4 and 5 in describing the operation of the present invention. First a determination is made whether there is a failure detected (step 610). If no failure has been detected, no action is taken (step 612). If there is a local failure detected, such as link failure or bit errors crossing a threshold on working link 523, the Ethernet MAC 507 or PHY 508 layer raises an interrupt for the MAC APS Controller 501A (step 620). The MAC APS Controller 501A is then invoked (step 630). The MAC APS Controller 501A causes all the failed physical links to switch over from the working link 523 to the protect 524 link (step 640). This can be done for all physical links associated with the logical working link 502. A determination is again made as to whether there is still a failure (step 650). If there is no more failure, no further action is taken (step 652). If the logical link continues to receive errors, then the MAC APS controller can cause the logical link switchover from logical working link 502 to logical protect link 513 (step 660).

When a remote or far end node wants to request a switchover, it sends an Ethernet MAC APS frame with the appropriate APS command in the K1/K2 bytes (steps 642, 662, and 682). When a near end node receives the frame, the appropriate switchover is executed. If the opcode is 0x0002, then the physical link switches over (executing step 640). If the opcode is 0x0003, then the logical link switches over (executing step 660). If the opcode is 0x0004, then the path switches over (executing step 680).

The above-described functionality allows for path level protection in ring topology as defined by the SDH/SONET standards. In order to support path level APS in mesh topology, the method can continue as follows.

Using the unicast MAC addresses of the end points for the destination address 403 and the path level APS opcode 0x0003 in the opcode field 406 in FIG. 4, path level APS can be supported. The unicast MAC address can be that of the working or protect port, or that of the port being protected by APS. When an APS path is configured, external software then provides the path to the APS controller. The information can also be stored in the MAC APS state registers and used to create the path APS control frame. In the example case of path level APS support, the APS frame is sent to the two end points of the circuit, where the MAC hardware receives the frame with the path APS opcode specified in the MAC APS Control Frame. In order for this to occur, a higher level application can already have caused the path to the end points to be learned and not aged until the APS path configuration is removed. Alternatively, the higher level application can continue to rely on learning, although learning may not be able to achieve sub 50 ms restoration times. To provide priority to the APS frame 400, the VLAN field 410 can be set up with appropriate priority.

To continue with the method as illustrated in FIG. 6, a determination is again made as to whether a failure still exists (step 670). If no failure exists, no action is taken (step 672). If a failure does exist, the APS frame 400 goes through the generic APS control mechanism and invokes the MAC APS Controller 501A, which detects that this was received as a path level request (step 682) and executes the path level switchover (step 680). The MAC APS Controller 501A then invokes the higher application, which updates its path state and additional post switchover processing. Post switchover processing could include configurations for finding alternative protect paths, or other functionality.

It should be noted that if the VLAN tag 410 is used for path level protection, then by definition, all the stations/nodes along the path need to be VLAN aware. Alternatively, the edge station/node can strip off the VLAN tag. Configuration must indicate that this is a VLAN edge station/node.

The APS frame 400 can additionally be constructed to include more information such as the Port ID 407C, Slot ID 407D, Bridge ID 407F, and node ID/IP 407G. These can be used for fault isolation.

To increase reaction speed, there can be two MAC APS Control Frame buffers, one for link level protection and one for path level protection. Because these two MAC APS Control Frames can be significantly different, they should not be constructed at the moment of failure. The logical and physical link frame are very similar so there might not be need for additional Frame buffer between the logical and physical link frames. The trade off for the implementation balance cost and efficiency.

In the instance where all three protections (i.e., physical level protection, link level protection, and path level protection) are in operation, the physical link protection is first to react (executing step 640). If the failure continues to persist (as determined at step 650), the logical link protection reacts (executing step 660). If the failure continues to persist (as determined at step 670), then path level protection is triggered, and the end stations execute a path level protection switchover (executing step 680). If a subsequent determination finds that there is no longer a failure, no further action is taken (step 692). However, if a failure is still detected, then an alarm is raised by external software for circuit failure (step 695), and concluding the method of operation as it relates to the present invention.

The present invention maintains several advantages. Because it does not change the Ethernet framing it is backward compatible and conforms to the Ethernet Standards. Because it modifies the optional Ethernet MAC Control sublayer, vendors can choose whether to implement the functionality of the present invention. The elegant design and configuration of the invention makes implementation in the MAC hardware relatively easy. The method of the present invention is event driven, thus APS frames are only sent when required. Therefore, the apparatus of the present invention maintains low overhead and consumes very little bandwidth. Because it reuses standard SDH/SONET APS definitions and process, the implementation of the present invention is fully compliant with the SDH/SONET standard protocol. Because it supports pre-configured frames and is not head of queue blocking, the present invention can be implemented to support switchover in 50 ms or less. In addition, the present invention makes use of standard SDH/SONET APS definitions and process, therefore it can support protection for linear, mesh, and ring topologies, physical level, logical level, and path level protection, and 1+1, N+1, and N:1 protection.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the invention, and exclusive use of all modifications that come within the scope of the appended claims is reserved. It is intended that the present invention be limited only to the extent required by the appended claims and the applicable rules of law.

What is claimed is:

1. An Ethernet PHY hardware device for supporting Ethernet MAC SDH/SONET Automatic Protection Switching (APS) functionality for managing protection from failures and recovery from failures on an Ethernet network, the device comprising:

at least one Ethernet PHY sublayer stored on the Ethernet PHY hardware device configured to monitor working and protect channels and generate an interrupt upon detection of a hard failure or a soft failure;

wherein upon detection of port failures or link failures the at least one Ethernet PHY sublayer interfaces with an Ethernet MAC APS Control sublayer or generates the interrupt to invoke an Ethernet MAC Client APS Controller configured to generate and terminate APS requests on working and protect channels to manage protection of working and protect channels from failures and recovery from failures on the Ethernet network; and wherein the Ethernet PHY hardware device is configurable for use with a plurality of different network topologies to manage protection from hard or soft failures and recovery from hard or soft failures on the Ethernet network using the at least one Ethernet PHY sublayer.

2. A method of providing SDH/SONET APS functionality on an Ethernet MAC hardware device and an Ethernet PHY hardware device by managing protection from failures and recovery from failures for an Ethernet Network, comprising:

detecting a soft failure or hard failure along a first link on a near end network node of a working or protect channel;

a PHY sublayer stored in the PHY hardware device interfacing with an Ethernet MAC APS Control sublayer or generating an interrupt when a soft failure or hard failure is detected to invoke a MAC Client APS Controller; and switching to a second link to correct the failure;

wherein the Ethernet MAC hardware device and the Ethernet PHY hardware device are configurable for use with a plurality of different network topologies to manage protection of working and protect channels from soft failures or hard failures and recovery from soft failures or hard failures on an Ethernet network; and wherein the Ethernet MAC hardware device comprises a MAC APS Control sublayer and a plurality of Ethernet MAC sublayers supporting SDH/SONET APS functionality and configured to process a MAC control frame stored on the Ethernet MAC hardware device.

3. The method of claim 2, wherein the method executes within 50 ms to provide recovery functionality on an Ethernet protocol network.

4. An Ethernet MAC hardware device for supporting Ethernet MAC SDH/SONET Automatic Protection Switching (APS) functionality by managing protection from failures and recovery from failures on an Ethernet network, the device comprising:

at least one MAC sublayer stored on the Ethernet MAC hardware device adapted to monitor working and protect channels and interface for detecting and indicating a soft failure or hard failure by monitoring working or protect channels;

wherein the Ethernet MAC hardware device is configured to interface with the Ethernet MAC APS Control sublayer or invokes an Ethernet MAC Client APS Controller for use with a plurality of different network topologies to manage protection of working and protect channels from soft failures or hard failures and recovery from soft failures or hard failures on an Ethernet network; and wherein the Ethernet MAC hardware device comprises a MAC APS Control sublayer and a plurality of Ethernet MAC sublayers supporting SDH/SONET APS functionality and configured to process a MAC control frame stored on the Ethernet MAC hardware device.

5. A method of providing SDH/SONET APS functionality on an Ethernet MAC hardware device by managing protection from failures and recovery from failures for an Ethernet Network, comprising:

detecting a soft failure or hard failure along a first line on a near end network node of a working or protect channel;

a MAC sublayer stored in the MAC hardware device indicating when a soft failure or hard failure is detected to interface with the Ethernet MAC sublayer or invoke a MAC Client APS Controller; and switching to a second link to correct the failure;

wherein the Ethernet MAC hardware device is configurable for use with a plurality of different network topologies to manage protection of working and protect channels from soft failures or hard failures and recovery from soft failures or hard failures on an Ethernet network; and wherein the Ethernet MAC hardware device comprises a MAC APS Control sublayer and a plurality of Ethernet MAC sublayers supporting SDH/SONET APS functionality and configured to process a MAC control frame stored on the Ethernet MAC hardware device.

6. The method of claim 5, wherein the method executes within 50 ms to provide recovery functionality on an Ethernet protocol network.

7. A method of providing SDH/SONET APS functionality on an Ethernet MAC hardware device by managing protection from failures and recovery from failures for an Ethernet Network, comprising:

a MAC sublayer stored on the Ethernet MAC hardware device, the MAC sublayer configured to support APS functionality;

wherein the Ethernet MAC hardware device is configurable for use with a plurality of different network topologies to manage protection of working and protect channels from soft failures or hard failures and recovery from soft failure or hard failures on an Ethernet network; and wherein the Ethernet MAC hardware device comprises a MAC APS Control sublayer and a plurality of Ethernet MAC sublayers supporting SDH/SONET APS functionality and configured to process a MAC control frame stored on the Ethernet MAC hardware device.

8. The method of claim 7, wherein the MAC sublayer is configured to process APS management requests.

9. The method of claim 7, wherein the MAC sublayer is configured to process APS switchover requests.

10. The method of claim 7, wherein the method executes within 50 ms to provide recovery functionality on an Ethernet protocol network.

* * * * *

UNITED STATES PATENT AND TRADEMARK OFFICE
CERTIFICATE OF CORRECTION

Page 1 of 1

PATENT NO. : 7,746,768 B2
APPLICATION NO. : 12/125282
DATED : June 29, 2010
INVENTOR(S) : Rumi S. Gonda It is certified that error appears in the above-identified patent and that said Letters Patent is hereby corrected as shown below:

In the Claims:

Column 15, claim 1, line 2, the word "PITY" should read "PHY"

Column 15, claim 4, line 47, the word "an" should be added after "channels and"; and Column 15, claim 4, line 52, the word "invokes" should read "invoke"

Signed and Sealed this
Twenty-fourth Day of July, 2012

David J. Kappos
*Director of the United States Patent and Trademark Office*